United States Patent [19]

Miesterfeld et al.

[11] 3,962,677
[45] June 8, 1976

[54] SAFETY BELT WARNING SYSTEM

[75] Inventors: Frederick Otto Richard Miesterfeld, Troy; Stephen Jay Orris, Allen Park, both of Mich.

[73] Assignee: Chrysler Corporation, Highland Park, Mich.

[22] Filed: Aug. 18, 1975

[21] Appl. No.: 605,493

[52] U.S. Cl. .............................. 340/52 E; 180/82 C; 280/744; 307/10 SB
[51] Int. Cl.² ................... G08B 21/00; B60R 21/10
[58] Field of Search .......................... 340/52 E, 278; 307/10 SB; 280/150 SB; 180/82 C

[56] References Cited
UNITED STATES PATENTS

| | | | |
|---|---|---|---|
| 2,824,293 | 2/1958 | Meinhardt | 340/52 E |
| 3,133,277 | 5/1964 | Hood | 340/278 |
| 3,906,441 | 9/1975 | Anderson et al. | 340/52 E |

*Primary Examiner*—Glen R. Swann, III
*Attorney, Agent, or Firm*—Talburtt & Baldwin

[57] ABSTRACT

Both visible and audible warning signals are provided for the purpose of promoting safety belt usage by the occupants of a vehicle. The warning signals are given for a limited time period subsequent to actuation of the usual ignition switch from the "off" position to either "start" or "run" position. If the driver fastens his safety belt prior to the expiration of the aforesaid time period, the audible alarm is terminated. Accuracy in the timing function is attained via an electronic control circuit.

2 Claims, 3 Drawing Figures

3,962,677

SAFETY BELT WARNING SYSTEM

BACKGROUND AND SUMMARY OF THE INVENTION

The present invention pertains to a safety belt warning system for use in vehicles.

Present Federal Regulations have now eliminated the more stringent requirements relative to vehicle safety belt systems which were mandated by earlier Federal Regulations. The present regulations require that both visible and audible alarms be provided and that the alarms be given for a limited time period subsequent to operation of the vehicle ignition switch. Further, if the driver fastens his safety belt prior to the expiration of the time period, the audible alarm is to terminate.

Thermal bimetal timers have been proposed for complying with the present Federal Regulations. However, it has been found that such devices may be unable to successfully achieve the desired result. More particularly, the present Federal Regulations also impose a predetermined tolerance on the time period which the bimetal type timer devices may be incapable of consistently achieving on a production basis and in the temperature range to which automobiles are exposed when in use.

The present invention is directed toward a novel electronic control circuit for safety belt systems which can consistently on a mass production basis achieve compliance with present Federal Regulations using conventional electrical circuit components in the typical environments to which these devices are subjected when in use in an automobile. Moreover, the invention can provide precise control of the time period without requiring greatly complicated and expensive circuit constructions. Further, the invention is adaptable to a number of different modes of application which provide further utility in systems where different requirements may be imposed.

The foregoing features of the present invention along with additional benefits and advantages thereof will be seen in the ensuing description and claims which are to be taken in conjunction with the accompanying drawings.

DESCRIPTION OF THE PREFERRED EMBODIMENT

Figure 1:
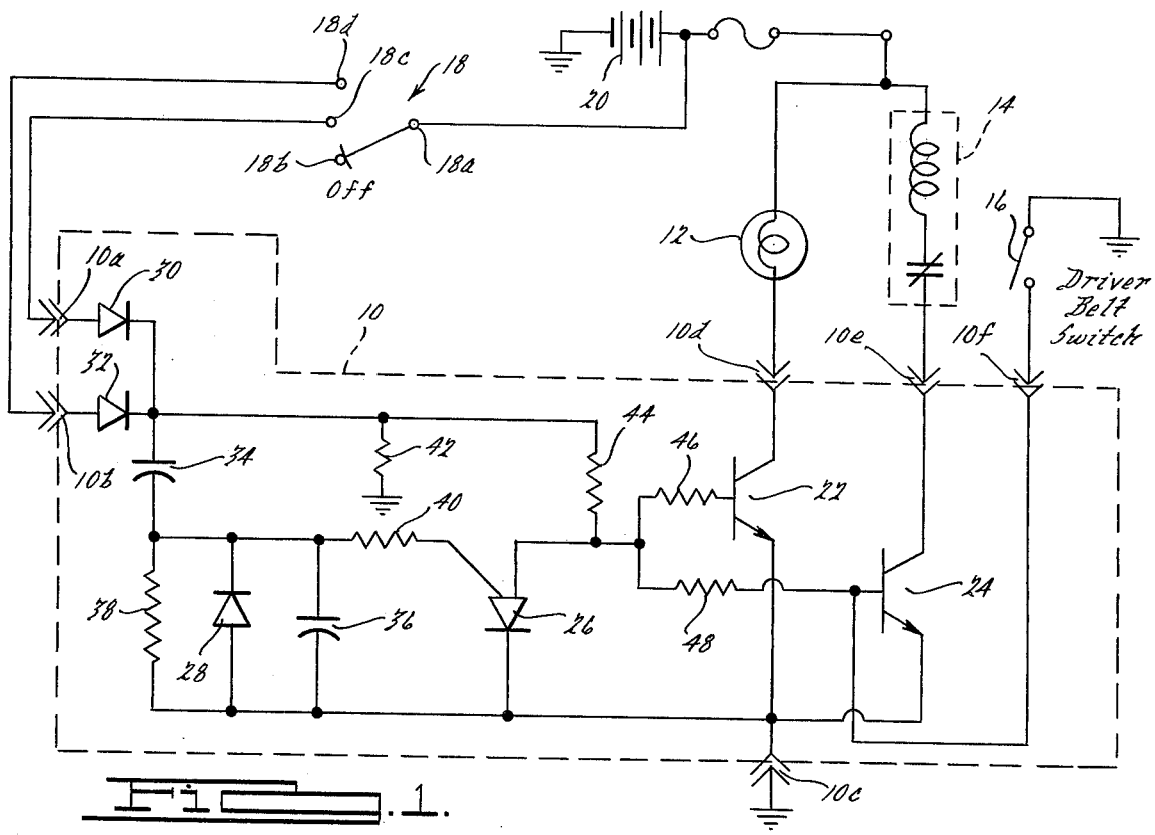
FIG. 1 is an electrical schematic diagram of a safety belt warning system incorporating principles of the present invention.

In FIG. 1 a system pursuant to principles of the present invention comprises an electronic circuit module 10, a warning lamp 12, a warning buzzer 14, a safety belt switch 16 for the driver's position; these are operably coupled with the vehicle electrical system including the vehicle ignition switch 18 and the vehicle battery 20. The battery terminal 18a of ignition switch 18 connects to the positive terminal of battery 20. The negative terminal of battery 20 is grounded. The terminal 18b of ignition switch 18 is the "off" terminal, 18c is the "run" terminal and 18d is the "start" terminal.

Circuit module 10 comprises six terminal pins 10a, 10b, 10c, 10d, 10e, and 10f via which the module connects with external components. Terminal 10a connects with terminal 18c; terminal 10b with terminal 18d; terminal 10c to ground; terminal 10e through buzzer 14 to the fused output of battery 20 and terminal 10f to driver safety belt switch 16. Driver safety belt switch 16 is a normally open, grounding type which provides a ground to terminal 10f when the driver's safety belt is indicated to be in use.

Module 10 further comprises a pair of main control transistors 22 and 24 which are respectively operatively associated with lamp 12 and buzzer 14. Transistor 22 has its collector-emitter circuit connected between terminals 10d and 10c to provide a controlled conduction path for lamp 12, and transistor 24 has its collector emitter circuit connected between terminals 10e and 10c to provide a controlled conduction path for buzzer 14.

A timer circuit is operably coupled with the base terminals of the two transistors 22, 24 and with ignition switch 18. The timer circuit comprises a programmable unijunction transistor (PUT) 26, a set of three diodes 28, 30 and 32; a pair of capacitors 34 and 36 and a set of four resistors 38, 40, 42 and 44. Further, a pair of resistors 46 and 48 are coupled to the base terminals of the two transistors. Capacitor 34 and resistor 38 form an RC charging circuit which is primarily responsible in controlling the timing function. The RC charging circuit is coupled through the diodes 32 and 30 to the ignition switch so that when the ignition switch is actuated to either the "run" or "start" position from the "off" position, the positive terminal of battery 20 is connected to one or both terminals 10a, 10b, to begin supplying charging current to the RC circuit. The switch terminals 18c, 18d are arranged in "make-before-break" configuration so that charging is uninterrupted when the ignition switch is operated between "start" and "run". It will be appreciated that during starting, battery voltage may appreciably drop from its nominal value. Because this changes both the charge rate and the reference potential for triggering, the circuit maintains the specified accuracy in the timing function regardless of when the ignition switch is returned to the "run" position. As capacitor 34 increasingly charges, the voltage potential at the junction of capacitor 34 and resistor 38 becomes decreasingly positive. This potential is coupled through resistor 40 to the anode gate of PUT 26. Essentially, full battery potential is coupled through resistor 44 to the anode of the PUT 26. Because the essentially full battery potential is coupled through resistor 44 to the anode of PUT 26, the connection of resistors 48 and 46 to the anode of PUT 26 results in the two transistors 22, and 24 being rendered conductive as capacitor 34 is charged in response to actuation of the ignition switch 18 from the "off" position. In turn lamp 12 and buzzer 14 are energized to provide both a visible and an audible warning signal. When the potential at the junction of capacitor 34 and resistor 38 drops sufficiently low to trigger PUT 26, then the PUT effectively shorts resistors 44, 46 and 48 to ground. When this happens, transistors 22 and 24 are rendered non-conductive to terminate the energization of lamp 12 and buzzer 14. The circuit construction is such that conventional electronic components achieve accuracy in the timing function which guarantees compliance with Federal Regulations over a range of temperature extremes.

When the ignition switch is operated to the "off" position, capacitor 34 rapidly discharges through a circuit path composed of resistor 42 and diode 28. Capacitor 36 is provided for noise immunity in preventing accidential triggering of PUT 26. In the event that the driver uses his safety belt during the timing period, closure of switch 16 immediately shorts the base of transistor 24 to ground thereby terminating the buzzer.

Figure 2:
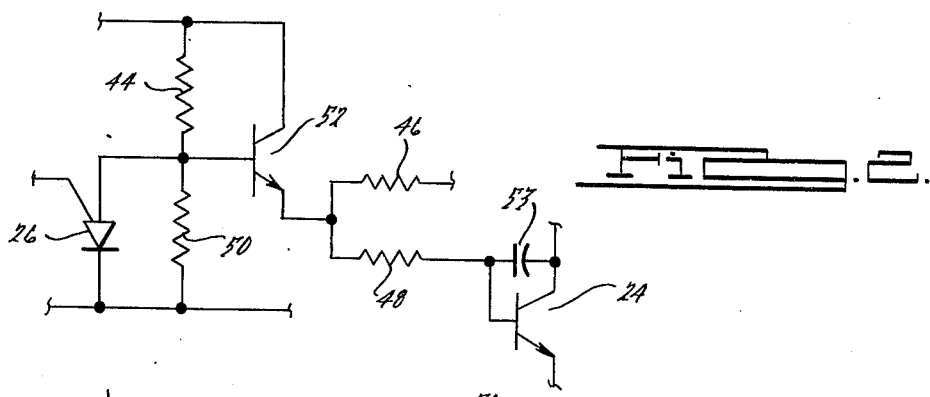
FIG. 2 is a fragmentary electrical schematic diagram illustrating a first modification to a portion of the circuit of FIG. 1.

FIG. 2 illustrates a first modification to a portion of the circuit of FIG. 1. Like components in the two figures are similarly identified. In the FIG. 2 embodiment, there are additionally provided a resistor 50 and a transistor 52 associated with the coupling circuit from PUT 26 to transistors 22 and 24. A capacitor 53 connects between the base and collector of transistor 24. With this arrangement even more precise control of the timing function is attained because transistor 52 isolates the reference voltage from changes due to belt switch actuation. Whereas the resistors in the FIG. 1 embodiment can be 5% devices, it is preferable to make resistors 38, 44, and 50 in the FIG. 2 embodiment 1% devices.

Figure 3:
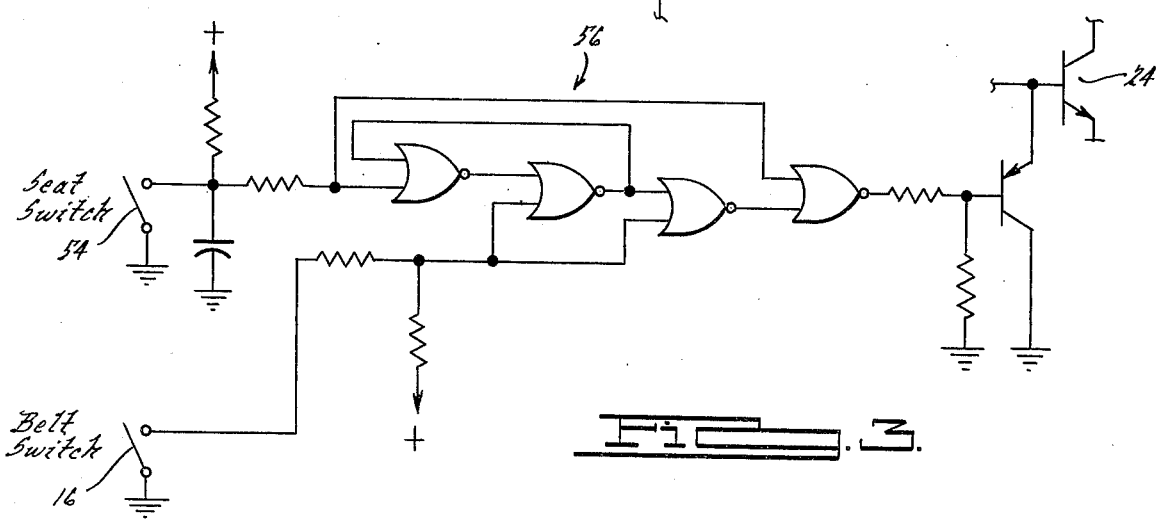
FIG. 3 is a fragmentary electrical schematic diagram illustrating another modification to the circuit of FIG. 1.

FIG. 3 illustrates a further modification wherein like components are identified by like numerals. In the FIG. 3 embodiment, in addition to the safety belt switch there is provided a seat switch 54. Both switch 16 and switch 54 are operably coupled through a sequence responsive network 56 to the base of transistor 24. The sequential network 56 is like that disclosed in U.S. Pat. No. 3,860,904 assigned to the same assignee of the present application. Briefly, the sequence responsive network 56 functions to monitor the sequence of operation of switches 54 and 16. Only when seat switch 54 is actuated prior to belt switch 16 is the buzzer terminated prior to the timing period.

By way of example, the following component values are suggested for the FIG. 1 embodiment:

| | |
|---|---|
| Capacitor 34 | 15 microfarads |
| Resistor 38 | 360 Kilohms |
| Resistor 42 | 1.5 Kilohms |
| Resistor 40 | 680 ohms |
| Resistor 44 | 1.0 Kilohm |
| PUT 26 | 2N6027 |
| Capacitor 26 | 0.1 microfarads |

What is claimed is:

1. In a vehicle safety belt warning circuit the combination with the vehicle battery and the vehicle ignition switch of a normally open safety belt switch associated with a safety belt of the vehicle, a warning lamp, a warning buzzer and an electronic control module operatively coupling the vehicle battery, ignition switch, warning lamp, warning buzzer and belt switch, said module comprising a first main control transistor having an emitter, collector, and base and having its emitter-collector circuit arranged to control conduction through the warning lamp, a second main control transistor having an emitter, collector, and base and arranged to have its emitter-collector circuit controlling conduction through the warning buzzer, means connecting the safety belt switch with the base of the second control transistor, and a timing network connecting the ignition switch with the base terminals of the two transistors, said timing network comprising an input RC charging circuit, diode means operatively coupling said charging circuit with a terminal of the ignition switch which is connected to the battery when the ignition switch is actuated from its off position, a programmable unijunction transistor having its anode-cathode circuit coupled through a resistor to said diode means, means coupling the anode of the programmable unijunction transistor with the base terminals of said first and second transistors, means coupling the anode-gate terminal of the programmable uni-junction transistor with the RC charging circuit for triggering the programmable uni-junction transistor after a certain charge has been given to said RC circuit, and means forming a discharge circuit for discharging the RC circuit when the ignition switch is operated to its off position.

2. The combination of claim 1 wherein the ignition switch has a start terminal and a run terminal and said diode means comprises a pair of diodes each coupled with a corresponding one of said start and run terminals.

* * * * *